US010828844B2

(12) United States Patent
Wu

(10) Patent No.: US 10,828,844 B2
(45) Date of Patent: Nov. 10, 2020

(54) VACUUM PACKAGED 3D VACUUM INSULATED DOOR STRUCTURE AND METHOD THEREFOR USING A TOOLING FIXTURE

(71) Applicant: WHIRLPOOL CORPORATION, Benton Harbor, MI (US)

(72) Inventor: Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 252 days.

(21) Appl. No.: 16/032,451

(22) Filed: Jul. 11, 2018

(65) Prior Publication Data

US 2018/0319094 A1 Nov. 8, 2018

Related U.S. Application Data

(63) Continuation of application No. 14/187,640, filed on Feb. 24, 2014, now Pat. No. 10,052,819.

(51) Int. Cl.
*E04C 2/00* (2006.01)
*B29C 65/72* (2006.01)
(Continued)

(52) U.S. Cl.
CPC .............. *B29C 65/72* (2013.01); *B32B 3/04* (2013.01); *B32B 3/06* (2013.01); *F25D 23/028* (2013.01);
(Continued)

(58) Field of Classification Search
CPC ....... B32B 3/06; B32B 3/04; B32B 2307/304; B32B 2509/10; B32B 2307/102;
(Continued)

(56) References Cited

U.S. PATENT DOCUMENTS 1,849,369 A 3/1932 Frost
1,921,576 A 8/1933 Muffly
(Continued)

FOREIGN PATENT DOCUMENTS

CA 626838 A 5/1961
CN 201748744 U 2/2011
(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.
(Continued)

*Primary Examiner* — Chi Q Nguyen
(74) *Attorney, Agent, or Firm* — Price Heneveld LLP

(57) ABSTRACT

A method for creating a vacuum insulated panel including preforming a continuous insulation member having male and female engaging surfaces and providing a barrier film envelope having an opening. The insulation member is disposed within the barrier film envelope and a tooling fixture is pressed against the barrier film envelope to press the barrier film envelope against the male and female engaging surfaces to remove gas from between the barrier film envelope and the male and female engaging surfaces. Substantially all gas is removed from within the barrier film envelope so that the barrier film envelope substantially conforms to an exterior surface of the insulation member. The opening of the barrier film envelope is then hermetically sealed, wherein the barrier film envelope forms a continuous layer over the core insulation member to form a vacuum insulated panel.

20 Claims, 11 Drawing Sheets

(51) Int. Cl.
*F25D 23/02* (2006.01)
*B32B 3/04* (2006.01)
*B32B 3/06* (2006.01)
B29L 9/00 (2006.01)

(52) U.S. Cl.
CPC ....... *B29L 2009/00* (2013.01); *B32B 2250/04* (2013.01); *B32B 2307/304* (2013.01); *B32B 2509/10* (2013.01); *F25D 2201/14* (2013.01); *Y02B 40/00* (2013.01); *Y10T 428/231* (2015.01)

(58) Field of Classification Search
CPC ..... B32B 3/00; B32B 2250/04; F25D 23/028; F25D 2201/14; F25D 23/00; F25D 23/02; Y10T 428/231; B29L 2009/00; Y02B 40/34
USPC ..... 52/782.1, 783.1, 783.11, 783.12; 428/69; 156/286
See application file for complete search history.

(56) References Cited

U.S. PATENT DOCUMENTS

| | | |
|---|---|---|
| 2,191,659 A | 2/1940 | Hintze |
| 2,432,042 A | 12/1947 | Richard |
| 2,451,884 A | 10/1948 | Stelzer |
| 2,729,863 A | 1/1956 | Kurtz |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,408,316 A | 10/1968 | Mueller et al. |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,670,521 A | 6/1972 | Dodge, III et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,330,310 A | 5/1982 | Tate, Jr. et al. |
| 4,396,362 A | 8/1983 | Thompson et al. |
| 4,529,368 A | 7/1985 | Makansi |
| 4,583,796 A | 4/1986 | Nakajima et al. |
| 4,681,788 A | 7/1987 | Barito et al. |
| 4,781,968 A | 11/1988 | Kellerman |
| 4,865,875 A | 9/1989 | Kellerman |
| 4,870,735 A | 10/1989 | Jahr et al. |
| 4,914,341 A | 4/1990 | Weaver et al. |
| 5,084,320 A | 1/1992 | Barito et al. |
| 5,094,899 A | 3/1992 | Rusek, Jr. |
| 5,121,593 A | 6/1992 | Forslund |
| 5,168,674 A | 12/1992 | Molthen |
| 5,171,346 A | 12/1992 | Hallett |
| 5,227,245 A | 7/1993 | Brands et al. |
| 5,251,455 A | 10/1993 | Cur et al. |
| 5,375,428 A | 12/1994 | LeClear et al. |
| 5,500,287 A | 3/1996 | Henderson |
| 5,500,305 A | 3/1996 | Bridges et al. |
| 5,505,810 A | 4/1996 | Kirby et al. |
| 5,509,248 A | 4/1996 | Dellby et al. |
| 5,532,034 A | 7/1996 | Kirby et al. |
| 5,533,311 A | 7/1996 | Tirrell et al. |
| 5,599,081 A | 2/1997 | Revlett et al. |
| 5,600,966 A | 2/1997 | Valence et al. |
| 5,768,837 A | 6/1998 | Sjoholm |
| 5,792,801 A | 8/1998 | Tsuda et al. |
| 5,826,780 A | 10/1998 | Nesser et al. |
| 5,834,126 A | 11/1998 | Sheu |
| 5,866,247 A | 2/1999 | Klatt et al. |
| 5,918,478 A | 7/1999 | Bostic et al. |
| 5,950,395 A | 9/1999 | Takemasa et al. |
| 5,952,404 A | 9/1999 | Simpson et al. |
| 6,013,700 A | 1/2000 | Asano et al. |
| 6,063,471 A | 5/2000 | Dietrich et al. |
| 6,163,976 A | 12/2000 | Tada et al. |
| 6,164,739 A | 12/2000 | Schultz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,244,458 B1 | 6/2001 | Frysinger et al. |
| 6,266,970 B1 | 7/2001 | Nam et al. |
| 6,294,595 B1 | 9/2001 | Tyagi et al. |
| 6,485,122 B2 | 1/2002 | Wolf et al. |
| 6,428,130 B1 | 8/2002 | Banicevic et al. |
| 6,430,780 B1 | 8/2002 | Kim et al. |
| 6,519,919 B1 | 2/2003 | Takenouchi et al. |
| 6,629,429 B1 | 10/2003 | Kawamura et al. |
| 6,655,766 B2 | 12/2003 | Hodges |
| 6,689,840 B1 | 2/2004 | Eustace et al. |
| 6,736,472 B2 | 5/2004 | Banicevic |
| 6,860,082 B1 | 3/2005 | Yamamoto et al. |
| 7,008,032 B2 | 3/2006 | Chekal et al. |
| 7,197,792 B2 | 4/2007 | Moon |
| 7,197,888 B2 | 4/2007 | LeClear et al. |
| 7,207,181 B2 | 4/2007 | Murray et al. |
| 7,234,247 B2 | 6/2007 | Maguire |
| 7,263,744 B2 | 9/2007 | Kim et al. |
| 7,340,915 B2 * | 3/2008 | Kwon ..................... F25D 23/02 62/398 |
| 7,360,371 B2 | 4/2008 | Feinauer et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,794,805 B2 | 9/2010 | Aumaugher et al. |
| 7,845,745 B2 | 12/2010 | Gorz et al. |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,117,865 B2 * | 2/2012 | Allard ..................... F25D 23/04 62/440 |
| 8,157,338 B2 | 4/2012 | Seo et al. |
| 8,162,415 B2 | 4/2012 | Hagele et al. |
| 8,182,051 B2 | 5/2012 | Laible et al. |
| 8,197,019 B2 | 6/2012 | Kim |
| 8,266,923 B2 | 9/2012 | Bauer et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,590,992 B2 | 11/2013 | Lim et al. |
| 8,717,029 B2 | 5/2014 | Chae et al. |
| 8,752,921 B2 | 6/2014 | Gorz et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,778,477 B2 * | 7/2014 | Hwang ................ F16L 59/065 428/69 |
| 8,840,204 B2 | 9/2014 | Bauer et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |

(56) References Cited

U.S. PATENT DOCUMENTS

| | | | |
|---|---|---|---|
| RE45,501 E | 5/2015 | Maguire | |
| 9,056,952 B2 | 6/2015 | Eilbracht et al. | |
| 9,074,811 B2 | 7/2015 | Korkmaz | |
| 9,080,808 B2 | 7/2015 | Choi et al. | |
| 9,102,076 B2 | 8/2015 | Doshi et al. | |
| 9,103,482 B2 | 8/2015 | Fujimori et al. | |
| 9,125,546 B2 | 9/2015 | Kleemann et al. | |
| 9,140,480 B2 | 9/2015 | Kuehl et al. | |
| 9,140,481 B2 | 9/2015 | Curr et al. | |
| 9,170,045 B2 | 10/2015 | Oh et al. | |
| 9,170,046 B2 | 10/2015 | Jung et al. | |
| 9,188,382 B2 | 11/2015 | Kim et al. | |
| 8,955,352 B2 | 12/2015 | Lee et al. | |
| 9,221,210 B2 | 12/2015 | Wu et al. | |
| 9,228,386 B2 | 1/2016 | Thielmann et al. | |
| 9,267,727 B2 | 2/2016 | Lim et al. | |
| 9,303,915 B2 | 4/2016 | Kim et al. | |
| 9,310,123 B2* | 4/2016 | Guarino | F25D 23/02 |
| 9,328,951 B2 | 5/2016 | Shin et al. | |
| 9,353,984 B2 | 5/2016 | Kim et al. | |
| 9,410,732 B2 | 8/2016 | Choi et al. | |
| 9,423,171 B2 | 8/2016 | Betto et al. | |
| 9,429,356 B2 | 8/2016 | Kim et al. | |
| 9,448,004 B2 | 9/2016 | Kim et al. | |
| 9,463,917 B2 | 10/2016 | Wu et al. | |
| 9,482,463 B2 | 11/2016 | Choi et al. | |
| 9,506,689 B2 | 11/2016 | Carbajal et al. | |
| 9,518,777 B2 | 12/2016 | Lee et al. | |
| 9,568,238 B2 | 2/2017 | Kim et al. | |
| D781,641 S | 3/2017 | Incukur | |
| D781,642 S | 3/2017 | Incukur | |
| 9,599,392 B2* | 3/2017 | Wu | F25D 23/02 |
| 9,605,891 B2 | 3/2017 | Lee et al. | |
| 9,696,085 B2 | 7/2017 | Seo et al. | |
| 9,702,621 B2 | 7/2017 | Cho et al. | |
| 9,759,479 B2 | 9/2017 | Ramm et al. | |
| 9,777,958 B2 | 10/2017 | Choi et al. | |
| 9,791,204 B2 | 10/2017 | Kim et al. | |
| 9,833,942 B2 | 12/2017 | Wu et al. | |
| 10,065,389 B2* | 9/2018 | Park | B32B 3/08 |
| 2002/0004111 A1 | 1/2002 | Matsubara et al. | |
| 2002/0114937 A1 | 8/2002 | Albert et al. | |
| 2002/0144482 A1 | 10/2002 | Henson et al. | |
| 2003/0041612 A1 | 3/2003 | Piloni et al. | |
| 2003/0056334 A1 | 3/2003 | Finkelstein | |
| 2003/0157284 A1 | 8/2003 | Tanimoto et al. | |
| 2003/0167789 A1 | 9/2003 | Tanimoto et al. | |
| 2003/0173883 A1 | 9/2003 | Koons | |
| 2004/0144130 A1 | 7/2004 | Jung | |
| 2004/0226141 A1 | 11/2004 | Yates et al. | |
| 2005/0042247 A1 | 2/2005 | Gomoll et al. | |
| 2005/0229614 A1 | 10/2005 | Ansted | |
| 2006/0064846 A1 | 3/2006 | Espendola et al. | |
| 2006/0261718 A1 | 11/2006 | Miseki et al. | |
| 2006/0266075 A1 | 11/2006 | Itsuki et al. | |
| 2007/0266654 A1 | 11/2007 | Noale | |
| 2008/0044488 A1 | 2/2008 | Zimmer et al. | |
| 2008/0048540 A1 | 2/2008 | Kim | |
| 2008/0138458 A1 | 6/2008 | Ozasa et al. | |
| 2008/0196441 A1 | 8/2008 | Ferreira | |
| 2009/0032541 A1 | 2/2009 | Rogala et al. | |
| 2009/0131571 A1 | 5/2009 | Fraser et al. | |
| 2009/0205357 A1 | 8/2009 | Lim et al. | |
| 2009/0302728 A1 | 12/2009 | Rotter et al. | |
| 2009/0322470 A1 | 12/2009 | Yoo et al. | |
| 2010/0206464 A1 | 8/2010 | Heo et al. | |
| 2010/0218543 A1 | 9/2010 | Duchame | |
| 2010/0287843 A1 | 11/2010 | Oh | |
| 2010/0287974 A1 | 11/2010 | Cur et al. | |
| 2011/0011119 A1 | 1/2011 | Kuehl et al. | |
| 2011/0023527 A1 | 2/2011 | Kwon et al. | |
| 2011/0095669 A1 | 4/2011 | Moon et al. | |
| 2011/0215694 A1 | 9/2011 | Fink et al. | |
| 2011/0220662 A1 | 9/2011 | Kim et al. | |
| 2011/0309732 A1 | 12/2011 | Horil et al. | |
| 2012/0011879 A1 | 1/2012 | Gu | |
| 2012/0060544 A1 | 3/2012 | Lee et al. | |
| 2012/0099255 A1 | 4/2012 | Lee et al. | |
| 2012/0240612 A1 | 9/2012 | Wusthoff et al. | |
| 2012/0280608 A1 | 11/2012 | Park et al. | |
| 2012/0288193 A1* | 11/2012 | Hatakeyama | G06T 5/003 |
| | | | 382/167 |
| 2013/0026900 A1 | 1/2013 | Oh et al. | |
| 2013/0043780 A1 | 2/2013 | Ootsuka et al. | |
| 2013/0221819 A1 | 8/2013 | Wing | |
| 2013/0255304 A1* | 10/2013 | Cur | B29C 53/00 |
| | | | 62/338 |
| 2013/0270732 A1 | 10/2013 | Wu et al. | |
| 2013/0285527 A1 | 10/2013 | Choi et al. | |
| 2013/0293080 A1* | 11/2013 | Kim | F25D 23/02 |
| | | | 312/404 |
| 2013/0328472 A1 | 12/2013 | Shim et al. | |
| 2014/0009055 A1 | 1/2014 | Cho et al. | |
| 2014/0097733 A1 | 4/2014 | Seo et al. | |
| 2014/0166926 A1 | 6/2014 | Lee et al. | |
| 2014/0190978 A1 | 7/2014 | Bowman et al. | |
| 2014/0196305 A1 | 7/2014 | Smith | |
| 2014/0216706 A1 | 8/2014 | Melton et al. | |
| 2014/0232250 A1 | 8/2014 | Kim et al. | |
| 2014/0346942 A1 | 11/2014 | Kim et al. | |
| 2015/0011668 A1 | 1/2015 | Kolb et al. | |
| 2015/0015133 A1 | 1/2015 | Carbajal et al. | |
| 2015/0017386 A1 | 1/2015 | Kolb et al. | |
| 2015/0059399 A1 | 3/2015 | Hwang et al. | |
| 2015/0115790 A1 | 4/2015 | Ogg | |
| 2015/0159936 A1 | 6/2015 | Oh et al. | |
| 2015/0176888 A1 | 6/2015 | Cur et al. | |
| 2015/0184923 A1 | 7/2015 | Jeon | |
| 2015/0190840 A1 | 7/2015 | Muto et al. | |
| 2015/0224685 A1 | 8/2015 | Amstutz | |
| 2015/0241112 A1* | 8/2015 | Wu | F25D 23/02 |
| | | | 29/428 |
| 2015/0241115 A1 | 8/2015 | Strauss et al. | |
| 2015/0241118 A1 | 8/2015 | Wu | |
| 2015/0285551 A1 | 10/2015 | Aiken et al. | |
| 2016/0033194 A1* | 2/2016 | Sumihiro | F25D 23/04 |
| | | | 62/125 |
| 2016/0084567 A1 | 3/2016 | Fernandez et al. | |
| 2016/0116100 A1 | 4/2016 | Thiery et al. | |
| 2016/0123055 A1 | 5/2016 | Ueyama | |
| 2016/0161175 A1 | 6/2016 | Benold et al. | |
| 2016/0178267 A1 | 6/2016 | Hao et al. | |
| 2016/0178269 A1 | 6/2016 | Hiemeyer et al. | |
| 2016/0235201 A1 | 8/2016 | Soot | |
| 2016/0240839 A1 | 8/2016 | Umeyama et al. | |
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0038126 A1 | 2/2017 | Lee et al. | |
| 2017/0157809 A1 | 6/2017 | Deka et al. | |
| 2017/0176086 A1 | 6/2017 | Kang | |
| 2017/0184339 A1 | 6/2017 | Liu et al. | |
| 2017/0191746 A1* | 7/2017 | Seo | F25D 27/005 |
| 2018/0313598 A1* | 11/2018 | Jeong | F25D 23/006 |

FOREIGN PATENT DOCUMENTS

| | | |
|---|---|---|
| CN | 102717578 A | 10/2012 |
| CN | 202973713 U | 6/2013 |
| CN | 104816478 A | 8/2015 |
| CN | 105115221 | 12/2015 |
| CN | 2014963379 U | 1/2016 |
| DE | 4110292 A1 | 10/1992 |
| DE | 4409091 | 9/1995 |
| DE | 19914105 | 9/2000 |
| DE | 102011051178 A1 | 12/2012 |
| EP | 0645576 A1 | 3/1995 |
| EP | 1602425 A1 | 12/2005 |
| EP | 1624263 A2 | 8/2006 |
| EP | 2543942 A2 | 1/2013 |
| EP | 2878427 A1 | 6/2015 |
| FR | 2991698 A1 | 12/2013 |
| JP | 404165197 | 6/1992 |

(56) References Cited

FOREIGN PATENT DOCUMENTS

| | | |
|---|---|---|
| JP | 04165197 | 10/1992 |
| JP | 04309778 A | 11/1992 |
| JP | 11159693 A | 6/1999 |
| JP | 2000320958 A | 11/2000 |
| JP | 2002068853 | 3/2002 |
| JP | 3438948 | 8/2003 |
| JP | 2005069596 A | 3/2005 |
| JP | 2005098637 A | 4/2005 |
| JP | 2006161834 A | 6/2006 |
| JP | 2006200685 A | 8/2006 |
| JP | 2008190815 | 8/2008 |
| JP | 2013050267 A | 3/2013 |
| JP | 2013076471 A | 4/2013 |
| KR | 20050095357 A | 9/2005 |
| KR | 100620025 B1 | 9/2006 |
| KR | 1020070065743 A | 6/2007 |
| KR | 20090026045 | 3/2009 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 9721767 | 6/1997 |
| WO | 9920961 A1 | 4/1999 |
| WO | 9920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2010007783 A1 | 1/2010 |
| WO | 2010127947 A2 | 11/2010 |
| WO | 2011058678 A1 | 5/2011 |
| WO | 2012152646 | 11/2012 |
| WO | 2013116103 | 8/2013 |
| WO | 2013116302 | 8/2013 |
| WO | 2014038150 A1 | 3/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods for Producing Hollow Glass Microspheres," Powerpoint, cached from Google, Jul. 2009, 6 pages.

* cited by examiner

VACUUM PACKAGED 3D VACUUM INSULATED DOOR STRUCTURE AND METHOD THEREFOR USING A TOOLING FIXTURE

CROSS-REFERENCE TO RELATED APPLICATIONS

This application is a continuation of U.S. patent application Ser. No. 14/187,640 entitled VACUUM PACKAGED 3D VACUUM INSULATED DOOR STRUCTURE AND METHOD THEREFOR USING A TOOLING FIXTURE, filed on Feb. 24, 2014, now U.S. Pat. No. 10,052,819, the entire contents of which are incorporated herein by reference.

FIELD OF THE INVENTION

The invention is in the field of cabinet structures for refrigerators, and more specifically, cabinet structures that incorporate vacuum insulated panels.

SUMMARY

In one aspect, an appliance door includes a continuous and shaped core insulation member having an outer surface, wherein the outer surface is not a continuously planar surface and defines at least one, more typically a plurality of, female engaging surfaces and at least one, more typically a plurality of, male engaging surfaces. The core insulation member is a single integral piece having a thickness of between about 8 mm and about 20 mm. A continuous barrier film envelope surrounds the outer surface of the core insulation member. Substantially all of the air is removed from between the barrier film and the core insulation member such that the barrier film envelope engages the female engaging surfaces and the male engaging surfaces, and the core insulation member and the barrier film envelope together form a vacuum insulated panel having a first side and a second side. At least one of the first and second sides define a plurality of appliance module recesses positioned proximate the plurality of female engagement surfaces. A liner has an inner liner surface. At least a portion of the first side of the vacuum insulated panel engages the inner liner surface and a wrapper coupled with the liner and having an inner wrapper surface, and at least a portion of the second side of the vacuum insulated panel engages the inner wrapper surface.

In another aspect, a method for creating a vacuum insulated panel for an appliance includes the steps of preforming a continuous core insulation member having an exterior surface that is not a continuously planar surface and defining at least one male engaging surface and at least one female engaging surface. The core insulation member is a single integral piece having a thickness of between about 8 mm and about 20 mm, providing a barrier film envelope having at least one opening and disposing the core insulation member completely within the barrier film envelope. The method also includes pressing a tooling fixture against the barrier film envelope, wherein the tooling fixture includes a profile that matingly engages the at least one female engaging surface and at least a portion of the at least one male engaging surface. The tooling fixture presses the barrier film envelope against the at least one female engaging surface and at least a portion of the at least one male engaging surface to remove substantially all gas from between the barrier film envelope and the at least one female engaging surface and at least a portion of the at least one male engaging surface. Also included in the method is the step of removing gas from within the barrier film envelope. The barrier film envelope substantially conforms to the exterior surface of the core insulation member thereby hermetically sealing the barrier film envelope to form a continuous layer over the core insulation member to form a vacuum insulated panel.

Yet another aspect includes a method for creating a vacuum insulated door structure for an appliance that includes the step of providing a preformed liner having an inner liner surface and providing a preformed wrapper having an inner wrapper surface and an outer wrapper surface defining a dispensing zone. Also included is preforming a continuous core insulation member having a thickness of between about 8 mm and about 20 mm, wherein the core insulation member includes an exterior surface that is not a continuously planar surface and defines a plurality of female engaging surfaces and a plurality of male engaging surfaces, and disposing the core insulation member completely within a barrier film envelope. The method also includes pressing a tooling fixture against the barrier film envelope to dispose the barrier film envelope against the pluralities of female and male engaging surfaces, wherein the tooling fixture matingly engages the pluralities of female and male engaging surfaces to express substantially all gas from between the barrier film envelope and the pluralities of female and male engaging surfaces, and removing gas from within the barrier film envelope. The barrier film envelope substantially conforms to the exterior surface of the core insulation member. Additionally, the method includes the step of hermetically sealing the barrier film envelope to form a vacuum insulated panel having a first side and a second side, and disposing the vacuum insulated panel between the liner and the wrapper and sealing the inner liner to the outer wrapper. At least a portion of the first side of the vacuum insulated panel engages the inner liner surface and at least a portion of the second side engages the inner wrapper surface.

These and other features, advantages, and objects of the present device will be further understood and appreciated by those skilled in the art upon studying the following specification, claims, and appended drawings.

DETAILED DESCRIPTION OF EMBODIMENTS

Figure 1:
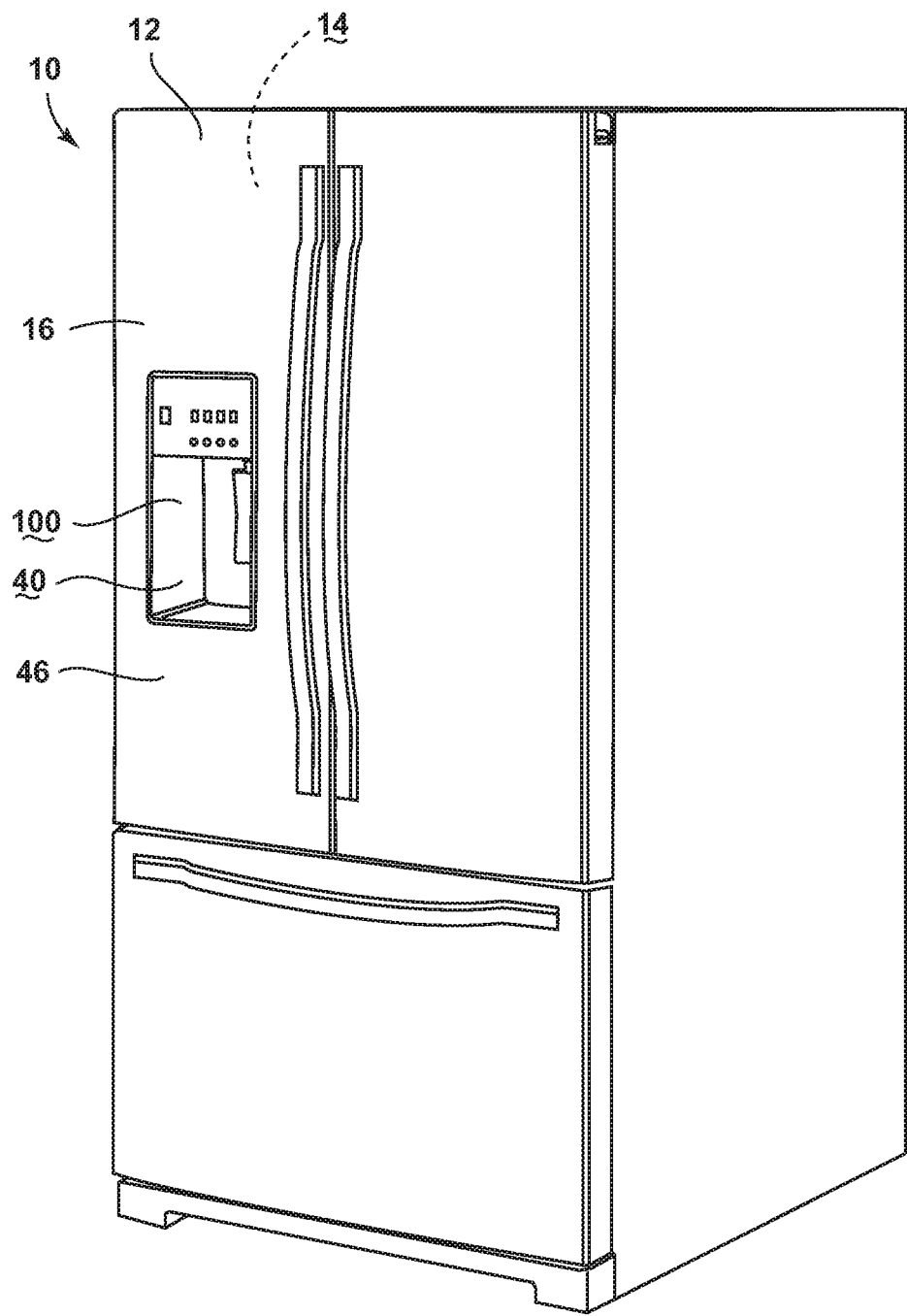
FIG. 1 is a front perspective of a refrigerator with the door in a closed position incorporating one embodiment of the vacuum insulated panel.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
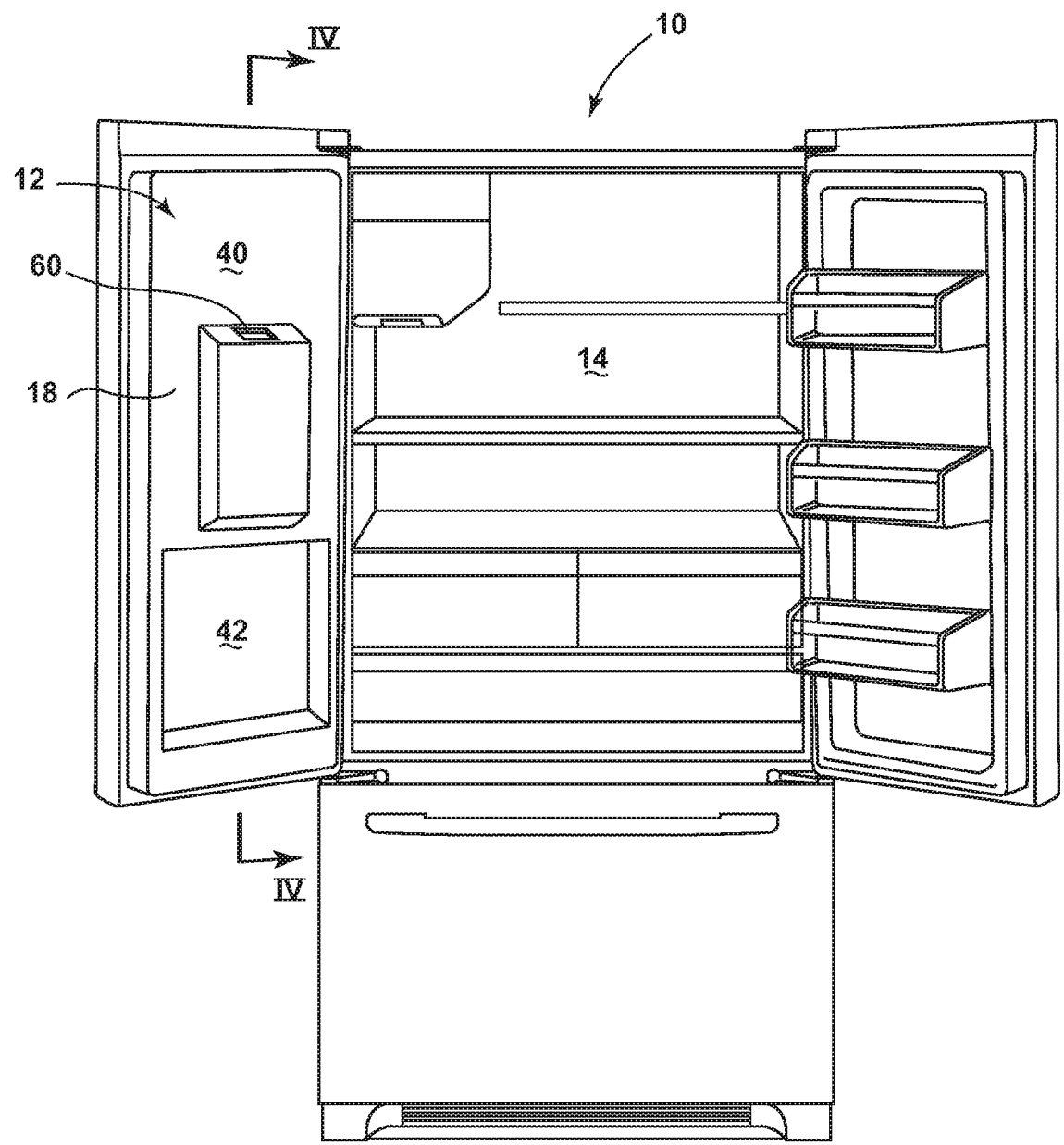
FIG. 2 is a front perspective of the refrigerator of FIG. 1 with the door in the open position.
Figure 3:
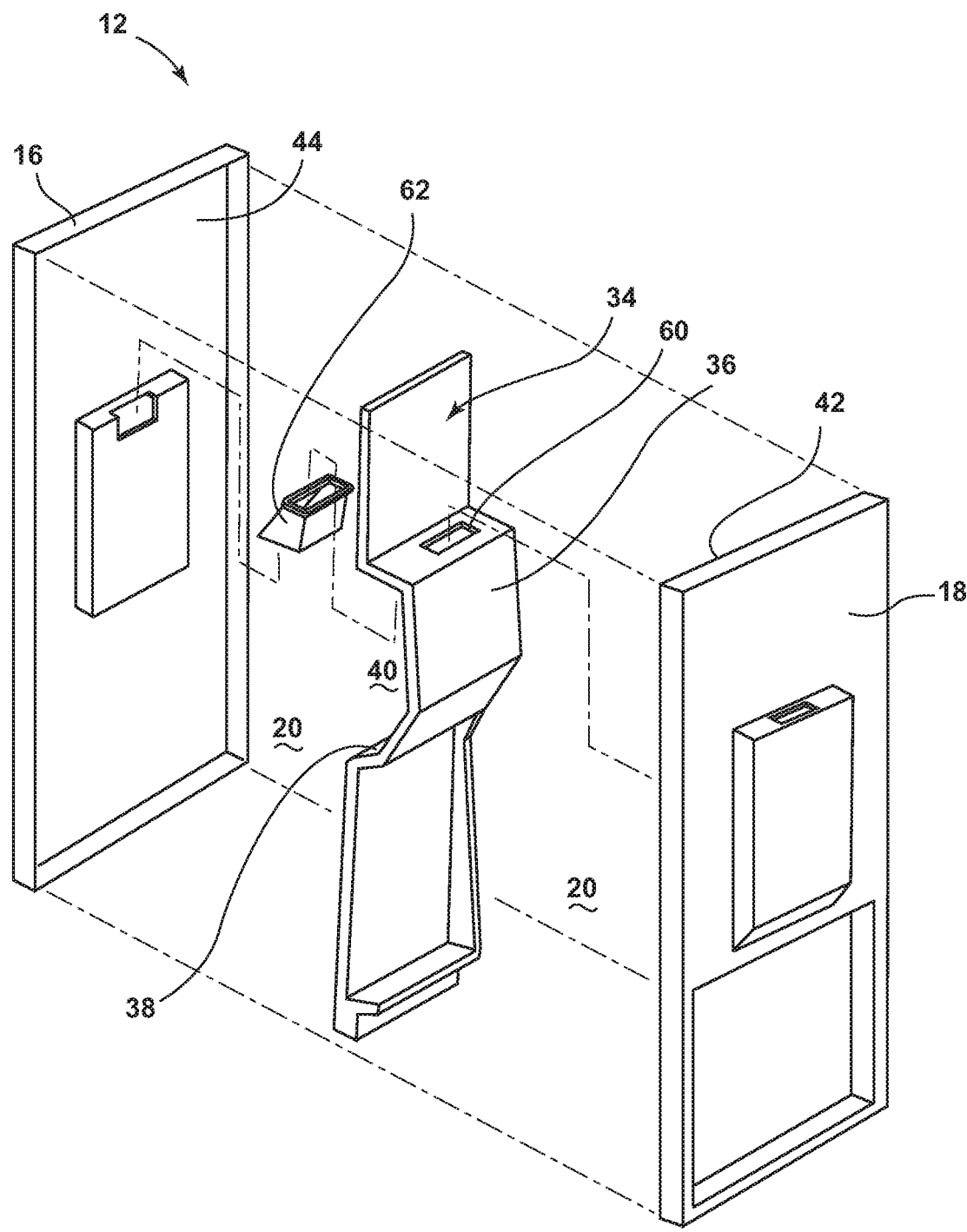
FIG. 3 is an exploded perspective view of a door of the refrigerator of FIG. 1 having a water and ice dispensing cavity.

With respect to FIGS. 1-3, a refrigerator 10 is generally shown. In each of these embodiments, the refrigerator 10 can have at least one door 12. Each door 12 is operable between open and closed positions. The refrigerator 10 also includes an interior 14 where the door 12 selectively provides access to the interior 14 of the refrigerator 10 when the door 12 is in the open position. The refrigerator door 12 can include an outer wrapper 16 and an inner liner 18 that define a cavity 20 disposed therebetween. An insulation panel is disposed within the cavity 20 to minimize the transfer of heat from the interior 14 of the refrigerator 10 through the door 12 to the exterior of the refrigerator 10.

As further illustrated in FIGS. 1-4, the appliance door 12 comprises a continuous core insulation member 22 having an outer surface 24, where the outer surface 24 defines at least one female engaging surface 26 and at least one male engaging surface 28. The continuous core insulation member 22 is not a fully planar member and can be made of a single integral piece. Alternatively, the core insulation member 22 can be made of multiple shaped or contoured pieces that are combined to form the core insulation member 22, wherein each of the shaped or contoured pieces can include at least one male and/or female engaging surface 26, 28. The outer surface 24 of the core insulation member 22 is not completely planar, but includes recessed and protruding members or sections as desired by the refrigerator design. A continuous barrier film envelope 30 surrounds the outer surface 24 of the core insulation member 22 and substantially all of the gas 32 is removed from between the barrier film envelope 30 and the core insulation member 22. In this manner, the barrier film sealingly engages the at least one female engaging surface 26 and the at least one male engaging surface 28. The core insulation member 22 and the barrier film envelope 30 cooperate to form a vacuum insulated panel 34 having a first side 36 and a second side 38, wherein at least one of the first and second sides 36, 38 define a plurality of appliance module recesses 40 positioned proximate the at least one female engaging surface 26. The vacuum insulated panel 34 is disposed proximate the liner 18 having an inner liner surface 42, such that at least a portion of the first side 36 of the vacuum insulated panel 34 engages the inner liner surface 42. The wrapper 16 is coupled with the liner 18 and includes an inner wrapper surface 44, wherein at least a portion of the second side 38 of the vacuum insulated panel 34 engages the inner wrapper surface 44. The wrapper 16 and the liner 18 are coupled together and form the cavity 20 into which the independently constructed vacuum insulated panel 34 is disposed.

Figure 4:
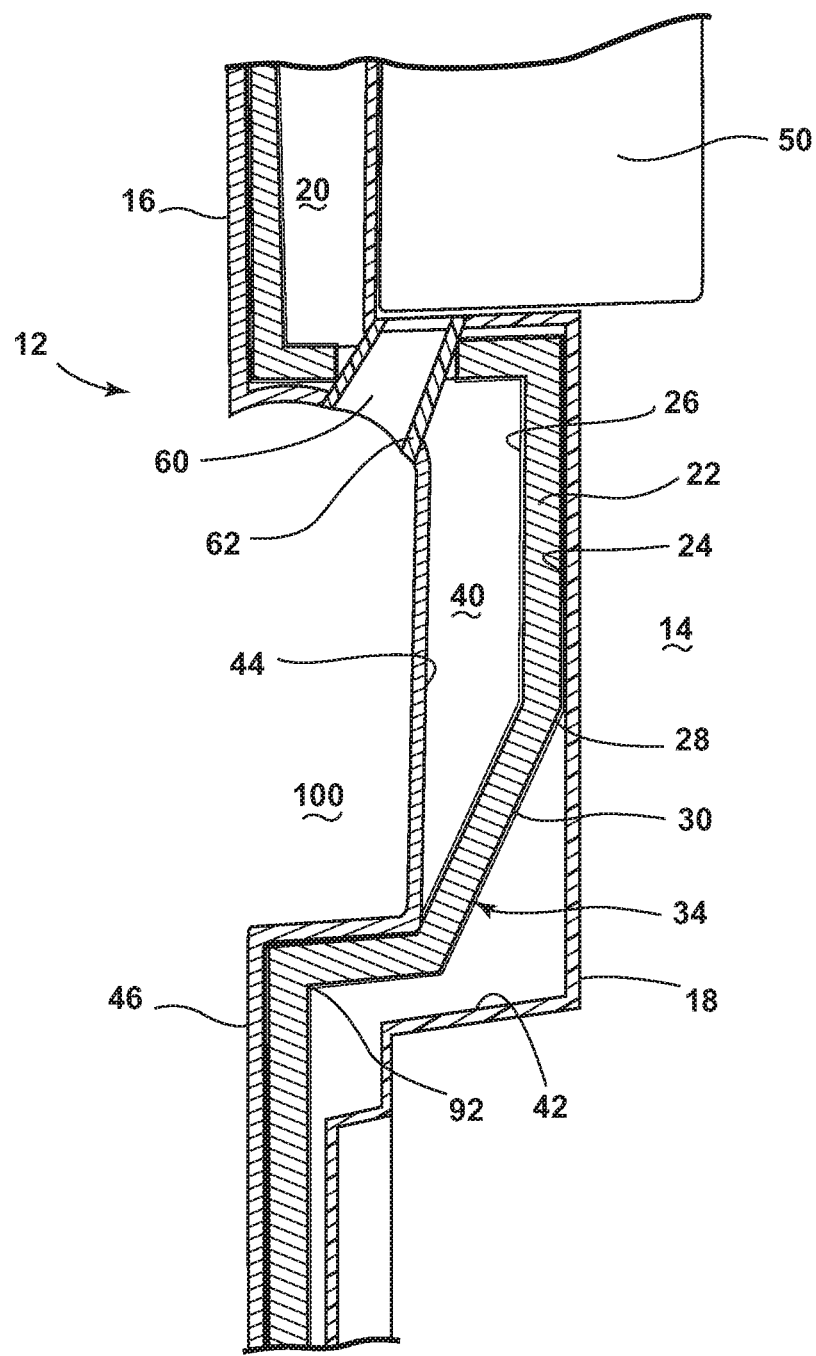
FIG. 4 is a detail cross sectional view of the refrigerator of FIG. 2 taken along line IV-IV.

As further illustrated in FIGS. 2-4, the vacuum insulated panel 34 can also define an aperture 60 extending therethrough from the first 36 to the second side 38 of the vacuum insulated panel 34. A tubular conduit 62 extends through the aperture 60 from the wrapper 16 to the liner 18. Because the barrier film envelope 30 completely surrounds the outer surface 24 of the core insulation member 22, the core insulation member 22 is separated from the tubular conduit 62 by the barrier film envelope 30.

The female 26 and male 28 engaging surfaces of the core insulation member 22 are defined by recesses disposed within the core insulation member 22. In various embodiments, a recess disposed into a surface of the core insulation member 22 defines a female engaging surface 26. At the same time, the recess disposed on one side of the core insulation member 22 can create a protrusion on the opposing side of the core insulation member 22. In this manner, the vacuum insulated panel 34 includes a substantially consistent thickness. This protrusion defines a male engaging surface 28. In alternate embodiments, the female and male engaging surfaces 28 can be defined by thinner and thicker portions of the core insulation member 22. In such an embodiment, a recess on one side of the core insulation member 22 does not necessarily define a cooperative protrusion on the opposing side, and vice versa. In other embodiments, female 26 and male 28 engaging surfaces can cooperate to define more complex engaging surfaces. A female engaging surface 26 may be positioned within at least a portion of a male engaging surface 28, or vice versa. In each embodiment, the female 26 and male 28 engaging surfaces cooperate to form at least a portion of the appliance module recesses 40 of the appliance 10.

As illustrated in FIG. 4, the plurality of appliance module recesses 40 may be configured to receive various appliance modules 50, such as at least one of an ice dispensing module, a water dispensing module, and a dispensing zone 100, along with other appliance modules 50 that can include, but are not limited to, a turbo chill module, a fast freeze module, a shock freeze module, a temperature controlled crisper compartment module, a fresh food compartment module, an ice making module, a heat exchanger module for dispensing cold or chilled water, a heat exchanger module for creating cold or chilled water to facilitate its carbonation and dispense a carbonated beverage and an airless cooling module.

In various embodiments, the core insulation member 22 of the illustrated embodiments can be made from materials that can include, but are not limited to, glass fiber, precipitated silica powder, fumed silica powder, combinations thereof, and other insulating materials. A porous membrane can be disposed around the precipitated or fumed silica powder to provide added strength and stability during the formation and handling of the core insulation member 22. The core insulation member 22 is a rigid and friable member that can be a single mass or can include a plurality of individually contoured members. The core insulation member 22 is formed into the shape of the vacuum insulated panel 34 such that the various female engaging surfaces 26 and male engaging surfaces 28 are defined by the exterior surface of the core insulation member 22. The male 28 and female 26 engaging surfaces are configured to receive or form various recesses that receive aspects of the refrigerator door 12. These aspects can include, but are not limited to, shelves, module recesses, module receptacles, electrical and/or mechanical aspects, dispensing zones, and the like. In this manner, the various male 28 and female 26 engaging surfaces of the core insulation member 22 cooperate with the wrapper 16 and liner 18 of the refrigerator door 12 to form and define appliance module recesses 40 disposed within and around the appliance door 12.

As shown in FIGS. 5-9, the barrier film envelope 30 is formed to the shape of a bag or pouch having a single primary opening 70 into which the core insulation member 22 can be inserted. In various embodiments, the primary opening 70 is disposed proximate a distal end 72 of the barrier film envelope. The primary opening 70 in the barrier film envelope 30 also provides an opening through which gas 32 can be removed from the barrier film envelope 30, thereby creating an at least partial vacuum. The at least partial vacuum within the barrier film envelope 30 serves to dispose the barrier film envelope 30 against the core insulation member 22 to create the vacuum insulated panel 34.

In various embodiments, the barrier film envelope 30 is made of at least one barrier film member that is sealed on at least one side to form the barrier film envelope 30. The barrier film envelope 30 can be preformed such that the core insulation member 22 can be inserted into the barrier film envelope 30 during assembly of the vacuum insulated panel 34. Alternatively, one or more barrier film members can be sealed to form the barrier film envelope 30 during assembly. In such an embodiment, the core insulation member 22 is placed upon a portion of a barrier film member, and another portion of the barrier film member is folded over the core insulation member 22 and sealed on one side to form the barrier film envelope 30 around the core insulation member 22. In another similar embodiment, the core insulation member 22 is placed upon a first barrier film member and a second barrier film member is placed on top of the core insulation member 22 and is sealed on at least one side to the first barrier film member to form the barrier film envelope 30 around the core insulation member 22. In each of these embodiments, the unsealed sides of the barrier film envelope 30 can then be sealed after substantially all of the gas is removed from the barrier film envelope 30 to form the vacuum insulated panel 34.

In the various embodiments, the barrier film envelope 30 can be made of materials that include, but are not limited to, polymer films, polymer based metalized films, metal foil, nylon, metalized film, polyethylene terephthalate (PET), low density polyethylene film (LDPE), metalized ethylene vinyl alcohol (EVOH), linear low-density polyethylene (LLDPE), various adhesive layers, aluminum foil, and other metalized or plastic layers, or combinations thereof. The barrier film envelope 30 can include alternating layers of polymer and metalized film with various protective and adhesive layers also included. In alternate embodiments, the barrier film envelope 30 can include multiple metal layers adjacent to multiple polymer layers, with various adhesive and protective layers included therein.

As shown in FIGS. 4-9, in various alternate embodiments, the barrier film envelope 30 can include more than one opening to account for any number of various apertures 60 disposed within the core insulation member 22. In such an embodiment, a secondary opening 80 disposed proximate an aperture 60 of the core insulation member 22 can be sealed within the aperture 60 to provide an airtight seal in the barrier film envelope 30 at the aperture 60 of the core insulation member 22. In this manner, gas 32 can be removed from the barrier film envelope 30, so that the barrier film envelope 30 is disposed against the entire core insulation member 22, including portions of the core insulation member 22 proximate the aperture 60. In such an embodiment, the secondary opening 80 can be preformed during the manufacture of the barrier film envelope 30. Alternatively, the secondary opening 80 can be created during the assembly of the vacuum insulated panel 34.

Referring again to FIG. 4, the appliance module recesses 40 can be disposed between the vacuum insulation panel 34 and the wrapper 16 or liner 18 of the refrigerator door 12. The appliance module recesses 40 can also be disposed adjacent the wrapper 16 or the liner 18. In such embodiments, the wrapper 16 and/or the liner 18 dictates the shape of the appliance module recess 40 and the vacuum insulated panel 34 conforms to at least a portion of the wrapper 16 and/or the liner 18 proximate the appliance module recess 40. The vacuum insulated panel 34 is a single integral, solid and continuous piece that can be disposed substantially along the length of the cavity 20 defined by the wrapper 16 and the liner 18. In this way, the core insulation member 22 can include a plurality of female 26 and male 28 engaging surfaces that make up a substantially complex geometric configuration. Additionally, the vacuum insulated panel 34 is configured to extend along at least about 80 percent of the inner wrapper surface 44 and up to as much as approximately 100 percent of the inner wrapper surface 44. Accordingly, the continuous and integral nature of the vacuum insulated panel 34 minimizes gaps within the insulation of the door 12 to minimize the loss of heat that is transferred from within the interior 14 of the refrigerator 10 to the exterior of the refrigerator 10 through the refrigerator door 12.

Figure 5:
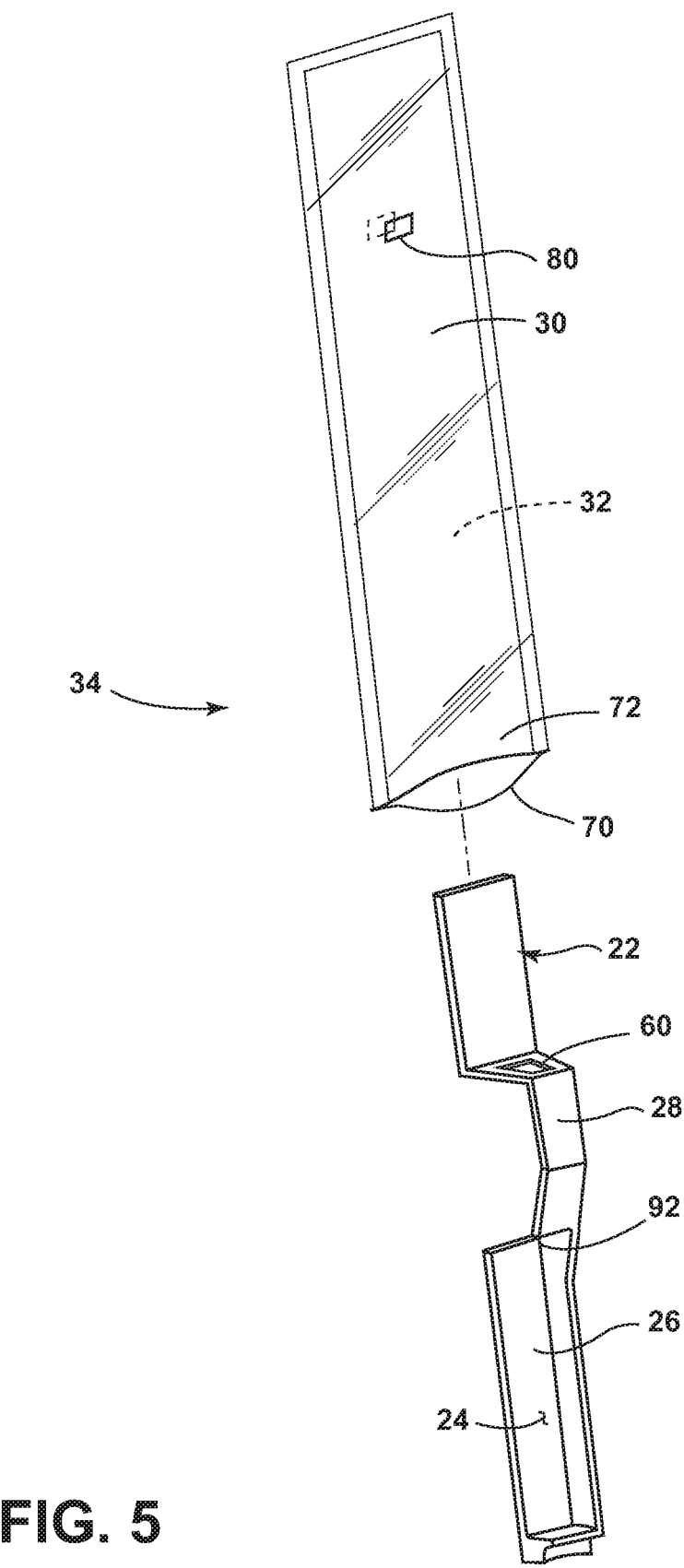
FIG. 5 is an exploded perspective view of another embodiment of the vacuum insulated panel with the core insulation member removed from the barrier film envelope.
Figure 6:
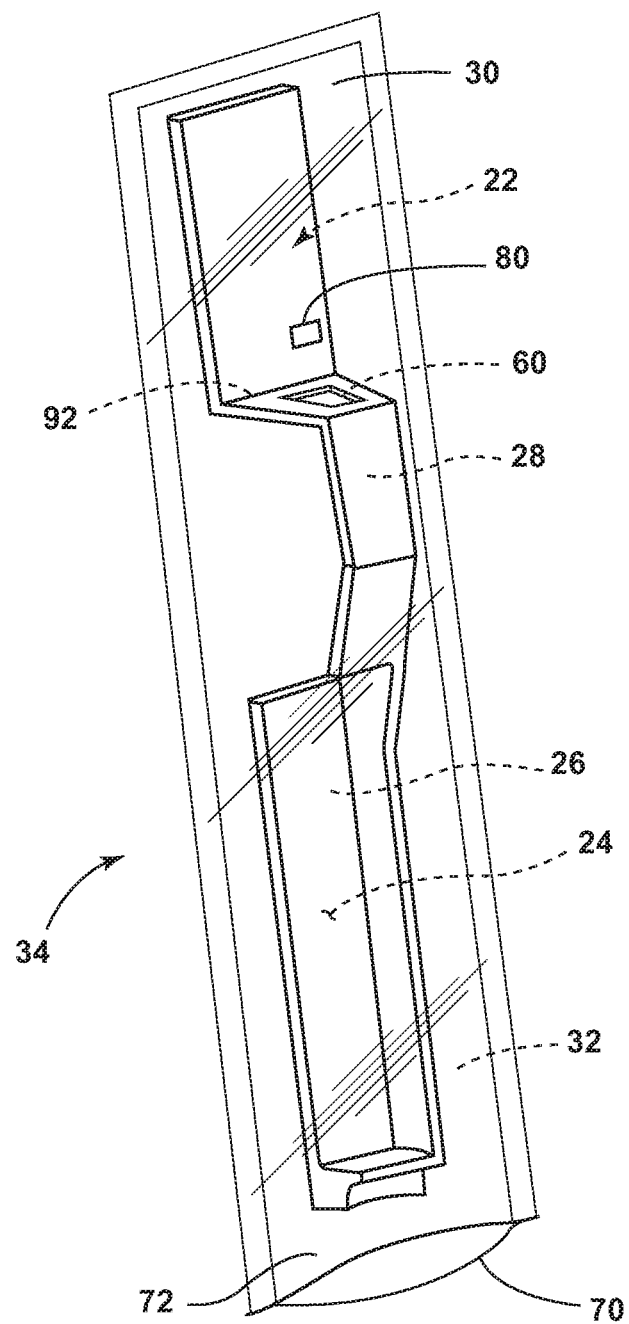
FIG. 6 is a perspective view of the embodiment of FIG. 5 with the core insulation member disposed within the barrier film envelope.
Figure 7:
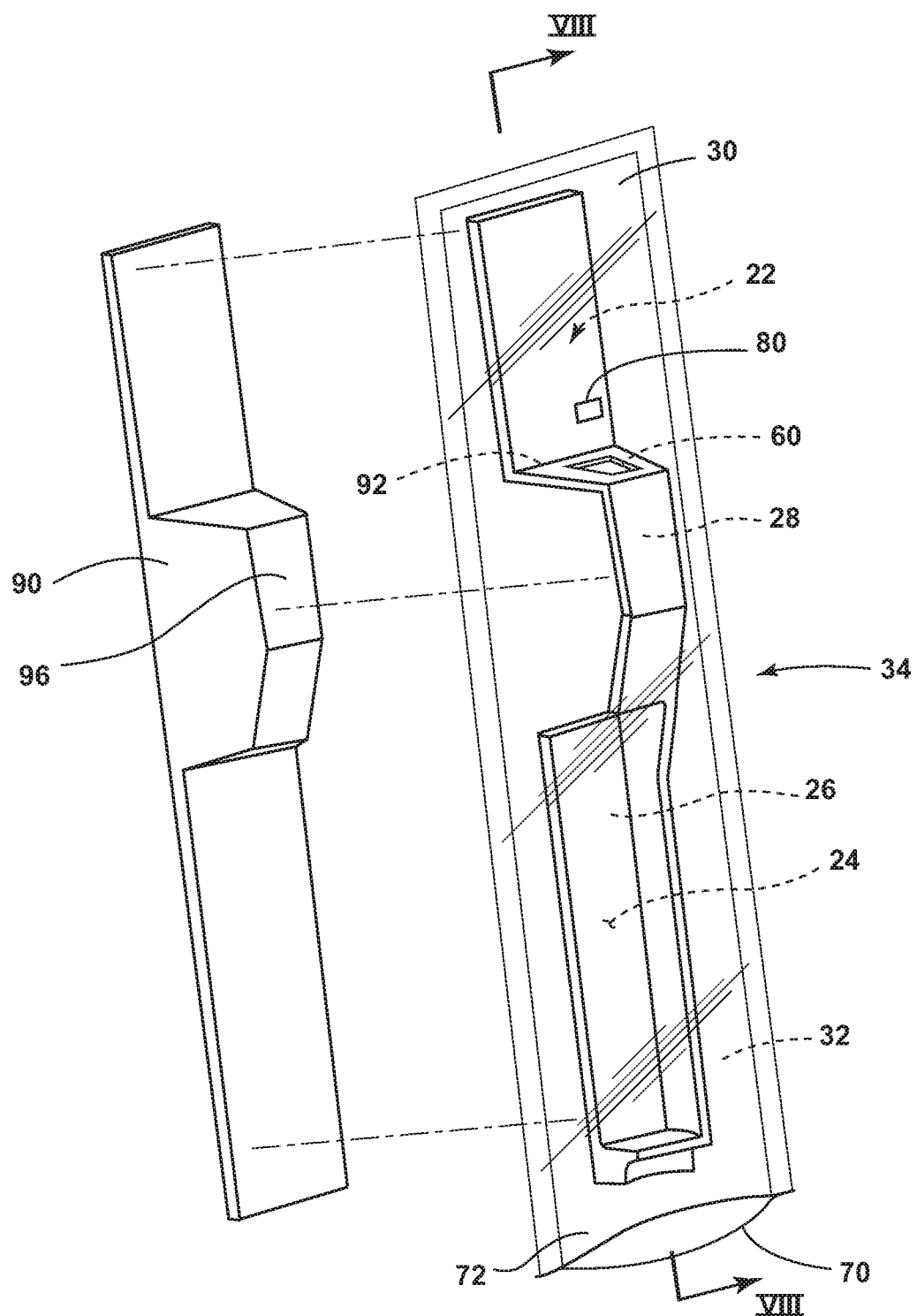
FIG. 7 is a perspective view of the embodiment of FIG. 5 with the tooling fixture about to be pressed against the barrier film envelope.

As illustrated in FIGS. 3-5, the vacuum insulated panel 34 is configured to engage at least a portion of the inner wrapper surface 44 and at least a part of the inner liner surface 42. In this manner, the vacuum insulated panel 34 maintains a consistent thickness of between approximately 8 mm to approximately 20 mm. Accordingly, the shape of the vacuum insulated panel 34, and the continuous and integral core insulation member 22, are created to substantially conform to the shape of the cavity 20 defined between the wrapper 16 and the liner 18. Additionally, the core insulation member 22, and, in turn, the vacuum insulated panel 34, must be shaped to define, with the wrapper 16 and/or the liner 18, the various appliance module receptacles 40. In addition, as will be described more fully below, the core insulation member 22 and the vacuum insulated panel 34 may also be shaped to define receptacles for piping, conduit and other supporting mechanical/electrical components of the appliance 10.

As illustrated in FIGS. 5-11, a method for creating a vacuum insulated panel 34 for an appliance door 12 is also disclosed. According to the method, step 902 includes preforming a continuous core insulation member 22 having an exterior surface that defines at least one male engaging surface 28 and at least one female engaging surface 26. The core insulation member 22 is a single integral piece that has a substantially consistent thickness of between about 8 mm and about 20 mm. According to step 904 of the method, a preformed barrier film envelope 30 is provided, wherein the barrier film envelope 30 is made according to the embodiments described above. Step 906 of the method includes disposing the core insulation member 22 completely within the barrier film envelope 30.

As illustrated in FIGS. 7-10, and according to the method, step 908 discloses pressing a tooling fixture 90 against the barrier film envelope 30. The tooling fixture 90 includes a profile that matingly engages the various female engaging surfaces 26 of the core insulation member 22 as well as at least a portion of the various male engaging surfaces 28 of the core insulation member 22. In this manner, the tooling fixture 90 presses the barrier film envelope 30 against the female engaging surfaces 26 and portions of the male engaging surfaces 28. The tooling fixtures 90 are configured to express the majority of the gas 32 from between the barrier film envelope 30 and the female engaging surfaces 26 and at least a portion of the male engaging surfaces 28. In this configuration, gas 32 can be more easily, efficiently, and, typically, substantially completely removed from within the barrier film envelope 30, so that substantially all of the surface of the core insulation member 22 is engaged by a portion of the barrier film envelope 30. By placing the barrier film envelope 30 proximate these portions, the tooling fixture 90 helps to create a stronger vacuum insulated panel 34. Additionally, by positioning the barrier film envelope 30 proximate the outer surface 24 of the core insulation member 22 at the male 28 and female 26 engaging surfaces, the tooling fixture 90 enables the male 28 and female 26 engaging surfaces to better define the appliance module recesses 40 that cooperate with the wrapper 16 and/or the liner 18 of the refrigerator door 12 to receive or define various aspects of the refrigerator 10.

According to the method, step 910 includes removing gas 32 from within the barrier film envelope 30 through a vacuum opening of the barrier film envelope 30. As gas 32 is removed from the barrier film envelope 30, the barrier film envelope 30, in conjunction with the placement of the tooling fixtures 90 as described in step 908, substantially conforms to the exterior surface of the core insulation member 22. The gas 32 can be removed from the barrier film envelope 30 by various mechanisms that include, but are not limited to, a vacuum chamber, a vacuum pump, or other similar mechanisms that can expel gas 32 from the interior of the barrier film envelope 30.

According to step 912, once substantially all of the gas 32 is removed from within the barrier film envelope 30, the primary opening 70 of the barrier film envelope 30 is hermetically sealed such that the barrier film envelope 30 forms a continuous layer over the core insulation member 22 to form the vacuum insulated panel 34. In various embodiments, as discussed above, various apertures 60 that may be disposed within the core insulation member 22 are also hermetically sealed, such that the barrier film envelope 30 can be hermetically sealed around the core insulation member 22. In this manner, an at least partial vacuum, but, more typically, at least a substantially complete or complete vacuum can be created within the barrier film envelope 30, whereby the barrier film envelope 30 is adhered to substantially all of the exterior surface of the core insulation member 22. The barrier film envelope 30 can be hermetically sealed by methods that include, but are not limited to, heat sealing, ultrasonic welding, or other method that will hermetically seal the barrier film envelope 30. It should be understood that a perfect vacuum is not necessary, and all of the gas 32 within the barrier film envelope 30 may not be removed during the step of removing gas 32 from within the barrier film envelope 30. Various wrinkles and edges may exist in the barrier film envelope 30, after the barrier film envelope 30 is hermetically sealed.

Figure 8:
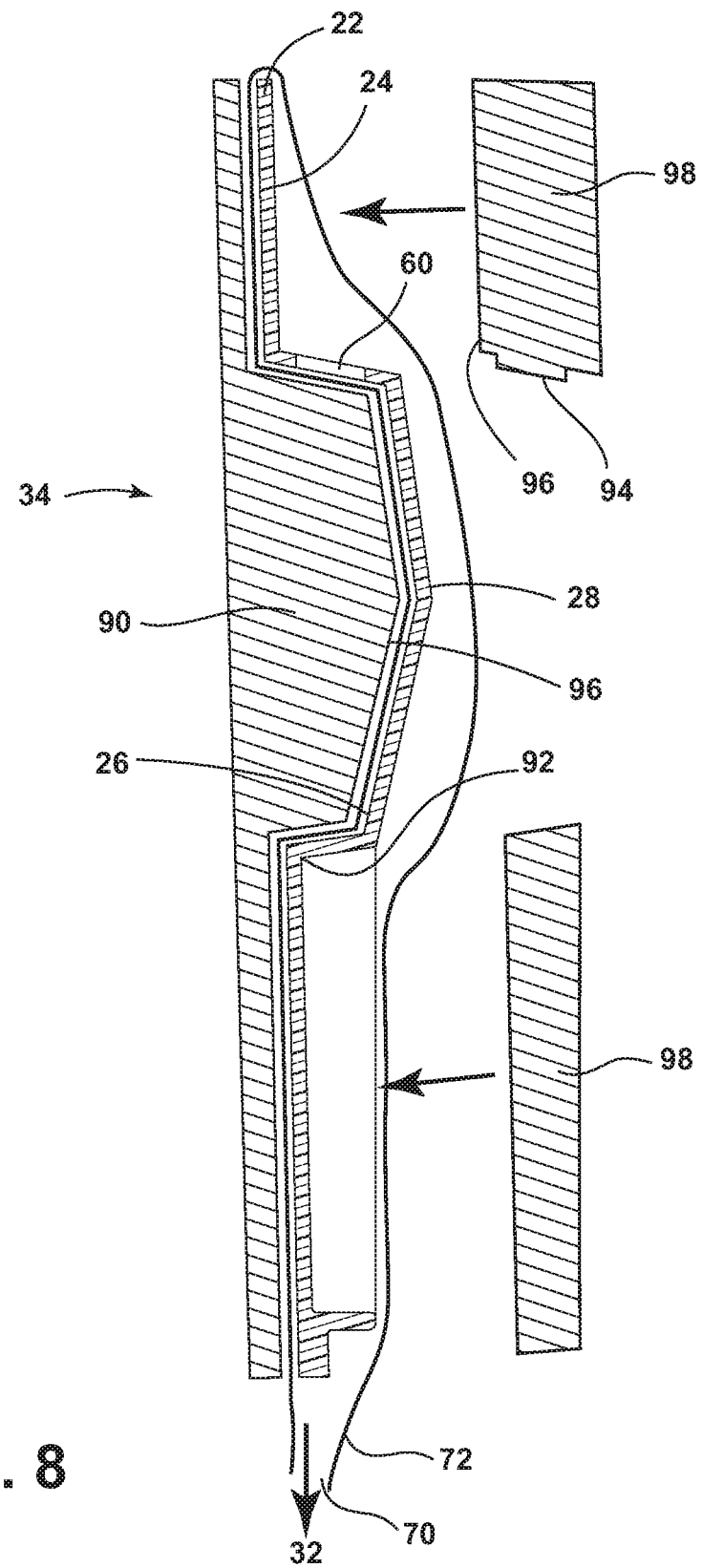
FIG. 8 is a cross-sectional view of the embodiment of FIG. 7, taken at line VIII-VIII, with the tooling fixtures being partially pressed against the barrier film envelope.
Figure 9:
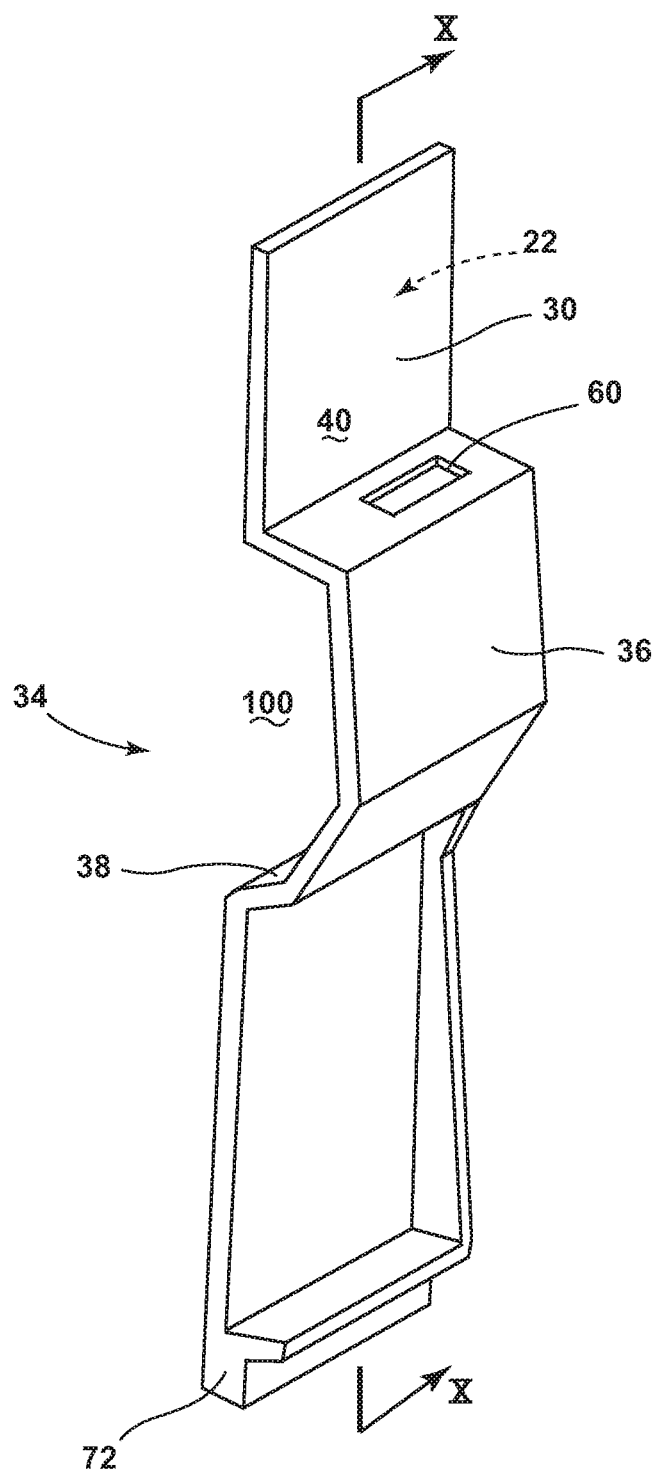
FIG. 9 is a perspective view of the embodiment of FIG. 7 with the gas removed from the barrier film envelope and the barrier film envelope hermetically sealed.
Figure 10:
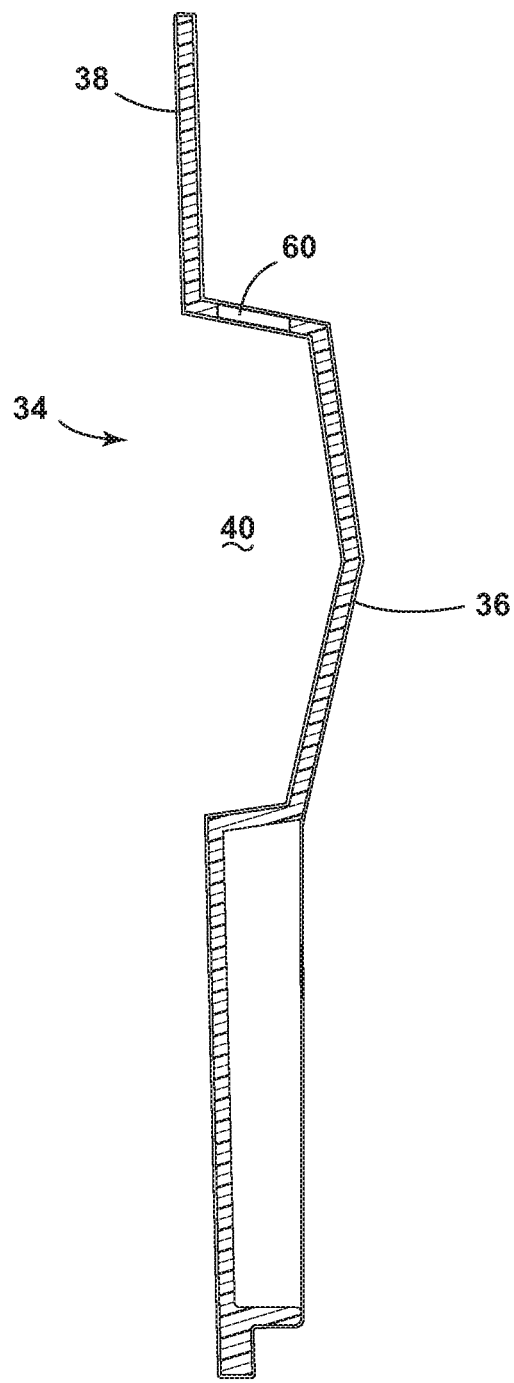
FIG. 10 is a cross-sectional view of the embodiment of FIG. 9 taken at line X-X.
Figure 11:
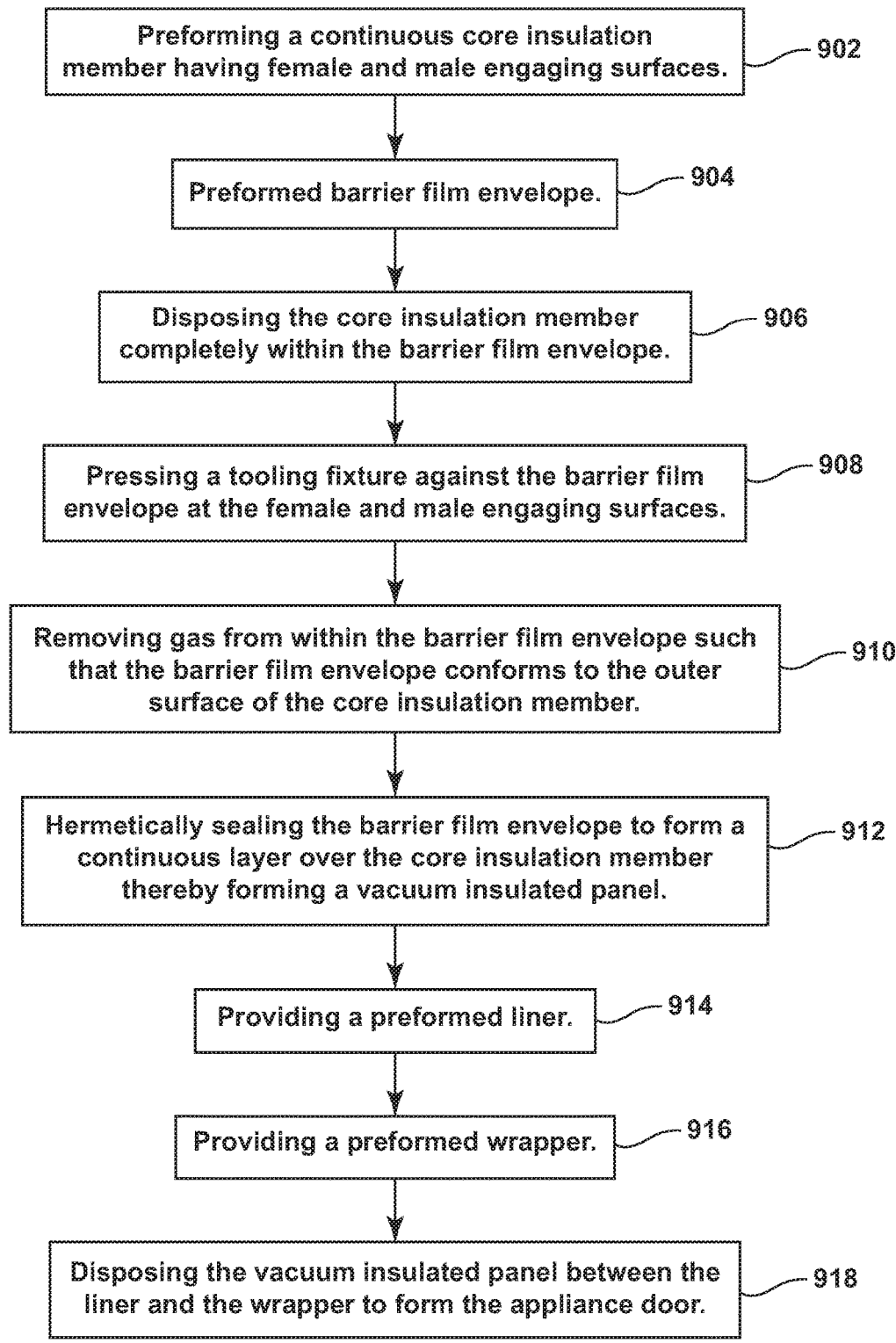
FIG. 11 is a flow-chart diagram illustrating steps of a method for creating a 3D vacuum insulated panel.

As illustrated in FIG. 8, the tooling fixture 90 described in step 908 can include a plurality of tooling members 98 that work together to press the barrier film envelope 30 against the various female engaging surfaces 26 and at least portions of the male engaging surfaces 28 defined by the exterior surface of the core insulation member 22. In this manner, the female engaging surfaces 26 and the interior angled portions 92 of the male engaging surfaces 28 of the core insulation member 22 are engaged by the barrier film envelope 30 when the plurality of tooling members 98 are pressed against the barrier film envelope 30 to dispose the barrier film envelope 30 against the core insulation member 22. The plurality of tooling members 98 can also include at least one aperture protrusion 94 that is pressed within an aperture 60 disposed within the core insulation member 22, such that substantially all of the gas 32 can be removed from the barrier film envelope 30 proximate any apertures 60 that are disposed within the core insulation member 22.

In various embodiments, the tooling fixture 90 or at least one of the tooling members 98 can include a generally convex portion 96 having a profile that matingly engages the female 26 and male 28 engaging surfaces. The tooling fixture 90 can also include a concave portion for matingly engaging the male engaging surfaces 28 of the core insulation member 22. The mating surface of the tooling fixture 90 can be pressed against the barrier film envelope 30 and the core insulation member 22 by hand or by some form of mechanical apparatus. In other various embodiments, the tooling fixture 90 can include perforations that allow gas 32 to pass through in order to prevent any gas 32 from collecting and being trapped between the tooling fixture 90 and the barrier film envelope 30. In such an embodiment, the perforations of the tooling fixture 90 are small enough such that the barrier film envelope 30 does not substantially protrude through the apertures 60 and deform the vacuum insulated panel 34. The tooling fixture 90 can take the form of fine mesh material or a surface having miniscule perforations. Also, in the various embodiments, the tooling fixture 90 can be made of materials that include, but are not limited to, metallic materials, plastics, composite materials, polymers, or other substantially rigid material that can be formed to matingly engage the barrier film envelope 30 and the core insulation member 22. Also, the plurality of tooling members 98 can be made of a combination of materials. In various embodiments, individual tooling members 98 can be made of different materials. Additionally, the tooling fixtures 90 can either be hollow or solid members, or a combination thereof.

In embodiments where a plurality of tooling members 98 are used, multiple tooling members 98 can cooperate where the core insulation member 22 includes particularly complex geometries. Such complex geometries can include, for example, a female engaging surface 26 with a smaller male engaging surface 28 incorporated therein, or a cavity 20 that extends within a male engaging surface 28 or within the core insulation member 22 itself. In such configurations, the tooling members 98 can be placed in a progression to ensure that substantially all of the core insulation member 22 is engaged by the barrier film envelope 30. In such an embodiment, the plurality of tooling members 98 can also be configured to have a mating engagement with one another.

According to step 914, a preformed liner 18 is provided, wherein the preformed liner 18 has an inner liner surface 42. The inner liner surface 42 cooperates with a first side 36 of the vacuum insulation panel 34 to define the various appliance module recesses 40 positioned proximate at least one of the female engaging surfaces 26 or at least one of the male engaging surfaces 28, or both. According to various embodiments, the liner 18 of the appliance 10 can be made of various plastic or metallic materials that can include, but are not limited to, aluminum, aluminum alloys, high impact polyvinyl, various other polymers, or combinations thereof. The liner 18 can be formed into various geometries that can include integral shelves, shelf receptacles that are removable by hand without the use of tools, and the various modules 50 that are removably by hand and without the use of tools are disposed within the interior 14 of the refrigerator 10 that can include, but are not limited to, an ice dispensing module, a water dispensing module, and a dispensing zone, along with other appliance modules that can include, but are not limited to, a turbo chill module, a fast freeze module, a shock freeze module, a temperature controlled crisper compartment module, a fresh food compartment module, an ice making module, a heat exchanger module for dispensing cold or chilled water, a heat exchanger module for creating cold or chilled water to facilitate its carbonation and dispense a carbonated beverage and an airless cooling module.

Additionally, as illustrated in FIGS. 1-4 and 11, according to step 916 of the method, a preformed wrapper 16 is provided, wherein the preformed wrapper 16 includes an inner wrapper surface 44 and an outer wrapper surface 46. The outer wrapper surface 46 can include and define a dispensing zone 100 into which water or ice can be disposed from within the refrigerator 10 for use by the user. Receptacles or receiving locations for various user interface modules 50 can also be defined by the outer wrapper surface 46. Similar to the liner 18, the inner wrapper surface 44 of the wrapper 16 cooperates with a second side 38 of the vacuum insulated panel 34 to define various other appliance module recesses 40 for receiving various aspects of the refrigerator 10. These various aspects can include the water dispensing mechanism, the ice dispensing mechanism, portions of the user interface for the water and/or ice dispensing systems, the dispensing zone 100 of the refrigerator 10, and other various mechanical and/or electrical aspects of the refrigerator 10. The preformed wrapper 16 can be made from various materials that can include, but are not limited to, stainless steel, aluminum, aluminum alloys, steel alloys, various plastic materials of various colors and textures, and various other metallic or plastic materials, or combinations thereof. Step 918 of the method includes disposing the vacuum insulated panel 34 between the liner 18 and the wrapper 16. If necessary, the tubular member is also disposed within an aperture 60 of the vacuum insulated panel 34 and the wrapper 16, liner 18 and tubular member are coupled together with the vacuum insulated panel 34 positioned within.

In various embodiments, the appliance module recesses 40 can be disposed within the cavity 20 defined by the wrapper 16 and the liner 18, and more specifically by the space between the inner wrapper surface 44 and the second side 38 of the vacuum insulated panel 34 and the inner liner surface 42 and the first side 36 of the vacuum insulated panel 34. In other alternate embodiments, the appliance module recesses 40 can be disposed proximate the outer wrapper surface 46 or within the interior 14 of the refrigerator 10 proximate the wrapper 16. Regardless of the exact position of the appliance module recesses 40, the core insulation member 22 disposed within the vacuum insulated panel 34 forms a continuous member that is a single integral piece that is typically configured to cooperate with the various geometries of the wrapper 16 and the liner 18, such that the vacuum insulated panel 34 conforms as one unit to the shape necessary to receive the various modules 50, mechanical and/or electrical aspects of the refrigerator 10 and the various dispensing aspects of the refrigerator 10. Also, the core insulation member 22 and the vacuum insulated panel 34 are configured such that at least a portion of the vacuum insulated panel 34 engages the inner wrapper surface 44 and at least a portion of the vacuum insulated panel 34 also engages the inner liner surface 42, such that the vacuum insulated panel 34 has an overall depth substantially equivalent to the thickness of the cavity 20.

As discussed above, the core insulation member 22, and, in turn, the vacuum insulated panel 34, can include at least one aperture 60 disposed therein. In such an embodiment, the tubular member can be disposed within the aperture 60 of the vacuum insulated panel 34 and the tubular member 62 extends from the wrapper 16 through the aperture 60 to the liner 18 of the refrigerator door 12. The tubular member 62 can take the form of a conduit and can have various geometries including, but not limited to, arcuate, rectilinear, or irregular configurations. The tubular member 62 is coupled with the outer wrapper 16 and the inner liner 18 proximate the aperture 60 of the vacuum insulated panel 34 to maintain the cavity 20 defined between the wrapper 16 and the liner 18. The tubular member 62 can be made of materials that include, but are not limited to, high impact polyvinyl, various metals or metal alloys, various other polymers or plastic materials of various colors and textures, or combinations thereof.

According to various aspects of the appliance door 12, the core insulation member 22 and in turn, the vacuum insulation panel 34, can include various female 26 and male 28 engaging surfaces that are configured to allow water piping, electrical conduits and wiring, door hinges, and other mechanical and/or electrical aspects of the refrigerator 10 to pass along or adjacent to the vacuum insulated panel 34, while allowing for minimal apertures 60 through which such aspects need to pass through the vacuum insulated panel 34 to maintain the continuous and integral nature of the core insulation member 22. A minimal number of apertures 60 may be required within the core insulation member 22, advantageously the minimal use of these apertures 60 substantially limits the amount of heat that unnecessarily escapes from the interior 14 of the appliance 10 through the appliance door 12 to the exterior of the appliance 10. As such, the continuous and integral nature of the core insulation member 22 provides fewer avenues through which heat can escape the appliance 10 over existing flat vacuum insulated panels or panels that use the wrapper and liner as a portion of the vacuum insulating material.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature with or without the use of tools and by hand unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. An appliance door comprising:
a continuous, shaped core insulation member configured to retain a shape under a vacuum having an outer surface, wherein the outer surface defines a female engaging surface and a male engaging surface;
a continuous barrier film envelope surrounding the outer surface of the continuous, shaped core insulation member, wherein at least substantially all air is removed from between the barrier film envelope and the continuous, shaped core insulation member such that the barrier film envelope engages the female engaging surface and the male engaging surface, and wherein the continuous, shaped core insulation member and the barrier film envelope form a vacuum insulated panel having a first side and a second side, wherein at least one of the first and second sides define a plurality of appliance module recesses positioned proximate the female engaging surface;
a liner having an inner liner surface, wherein at least a portion of the first side of the vacuum insulated panel engages the inner liner surface; and
a wrapper coupled with the liner and having an inner wrapper surface, wherein at least a portion of the second side of the vacuum insulated panel engages the inner wrapper surface, wherein a cavity is defined between the continuous barrier film envelope and at least one of the liner and the wrapper.

2. The appliance door of claim 1, wherein the core insulation member is a continuous piece.

3. The appliance door of claim 1, wherein the vacuum insulated panel defines an aperture extending therethrough, and wherein a conduit extends from the wrapper through the aperture to the liner.

4. The appliance door of claim 3, wherein the core insulation member is separated from the conduit by the barrier film envelope.

5. The appliance door of claim 3, wherein the barrier film envelope is sealed at the aperture to define a substantially air-tight seal.

6. The appliance door of claim 1, wherein the core insulation member is a solid and rigid member having a thickness of between about 8 millimeters to about 20 millimeters.

7. The appliance door of claim 1, wherein the core insulation member is a single integral piece, and wherein the plurality of appliance module recesses are configured to receive at least one of an ice dispensing module, a water dispensing module, and a dispensing zone and wherein the second side of the vacuum insulated panel engages at least approximately 80 percent of the inner wrapper surface.

8. The appliance door of claim 1, wherein the vacuum insulated panel is constructed independently of the wrapper and liner and the cavity defines a module recess that receives an appliance module.

9. The appliance door of claim 1, wherein the core insulation member includes at least one of fumed silica, precipitated silica and glass fibers.

10. An insulating structure for an appliance comprising:
a continuous, shaped core insulation member configured to retain a shape under a vacuum having an outer surface, wherein the outer surface defines a female engaging surface and a male engaging surface;
a continuous barrier film member surrounding the outer surface of the continuous, shaped core insulation member, wherein at least substantially all air is removed from between the barrier film member and the continuous, shaped core insulation member such that the barrier film member engages the male and female engaging surfaces, and wherein the continuous, shaped core insulation member and the barrier film member form a vacuum insulated panel having a first side and a second side, wherein at least one of the first and second sides define a plurality of appliance module recesses positioned proximate the female engaging surface, wherein the barrier film member and the core insulation member cooperatively define an aperture extending through the vacuum insulated panel, wherein the continuous barrier film member defines an exterior surface of the vacuum insulated panel, the exterior surface further defining at least one module recess that receives an appliance module.

11. The insulating structure of claim 10, wherein the barrier film member is a barrier film envelope.

12. The insulating structure of claim 10, further comprising:
- a liner having an inner liner surface, wherein at least a portion of the first side of the vacuum insulated panel engages the inner liner surface;
- a wrapper coupled with the liner and having an inner wrapper surface, wherein at least a portion of the second side of the vacuum insulated panel engages the inner wrapper surface; and
- a conduit extends from the wrapper through the aperture to the liner.

13. The insulating structure of claim 12, wherein the vacuum insulated panel, the liner, the wrapper and the conduit cooperate to form an appliance door.

14. The insulating structure of claim 12, wherein the core insulation member is separated from the conduit by the continuous barrier film member.

15. The insulating structure of claim 10, wherein the core insulation member is a solid and rigid member.

16. The insulating structure of claim 10, wherein the core insulation member is a single integral piece and having a thickness of between about 8 millimeters and about 20 millimeters.

17. The insulating structure of claim 10, wherein the continuous barrier film member is sealed at the aperture to define a substantially air-tight seal.

18. The insulating structure of claim 10, wherein the core insulation member includes at least one of glass fiber, fumed silica and precipitated silica.

19. An insulating structure for an appliance comprising:
- a continuous, shaped core insulation member configured to retain a shape under a vacuum having an outer surface that defines a female engaging surface and a male engaging surface, wherein the core insulation member is a solid, rigid member that is a single integral piece;
- a continuous barrier film envelope surrounding the outer surface of the continuous, shaped core insulation member, wherein:
- substantially all air is removed from between the barrier film envelope and the continuous, shaped core insulation member such that the barrier film envelope engages the male and female engaging surfaces;
- the continuous, shaped core insulation member and the barrier film envelope form a vacuum insulated panel having a first side that defines a plurality of appliance module recesses positioned proximate the female engaging surface, wherein the barrier film envelope and the core insulation member cooperatively define an aperture extending through the vacuum insulated panel proximate at least one of the female engaging surfaces, wherein the continuous barrier film envelope proximate at least one of the female and male engaging surfaces defines an appliance module recess.

20. The insulating structure of claim 19, wherein the core insulation member includes at least one of glass fiber, fumed silica and precipitated silica.

\* \* \* \* \*